April 10, 1951  E. H. KESEL  2,548,538
APPARATUS FOR MANUFACTURING SCREW STICKS
Filed March 11, 1947  2 Sheets-Sheet 1

Edwin H. Kesel
INVENTOR
BY
ATTORNEYS

April 10, 1951    E. H. KESEL    2,548,538
APPARATUS FOR MANUFACTURING SCREW STICKS
Filed March 11, 1947    2 Sheets-Sheet 2

Edwin H. Kesel
INVENTOR
BY
ATTORNEYS

Patented Apr. 10, 1951

2,548,538

UNITED STATES PATENT OFFICE 2,548,538

APPARATUS FOR MANUFACTURING SCREW STICKS

Edwin H. Kesel, Rochester, N. Y., assignor to Eastman Kodak Company, Rochester, N. Y., a corporation of New Jersey Application March 11, 1947, Serial No. 733,762

11 Claims. (Cl. 29—52)

This invention relates to apparatus for making screw sticks. One object of my invention is to provide a machine for manufacturing screw sticks which may operate at high speed. Another object of my invention is to provide a modification of a standard type of screw machine by which the required operations for the manufacture of screw sticks can be carried out without wasted motions. Another object of my invention is to provide a modified form of screw machine in which screw sticks of varying predetermined lengths may be produced. A still further object of my invention is to provide a machine for making screw sticks in which the speed of operation is such that the screw sticks may be manufactured at least as inexpensively as ordinary individual screws.

This machine is for an improvement over the apparatus for forming screw sticks shown in Patent No. 2,269,168, William H. Ure, granted January 6, 1942. My present invention, like that of the patent, may be readily applied to a known type of screw machine, such as the well-known Brown and Sharpe Manufacturing Company screw machine.

Coming now to the drawings wherein like reference characters denote like parts throughout:

Fig. 5 is a fragmentary section taken on line 5—5 of Fig. 1;

Fig. 6 is a fragmentary part-side elevation, part section, showing a cam in position to operate the cut-off tool through a cut-off cam follower;

Fig. 7 is a fragmentary perspective view showing a threading tool used with a preferred form of my invention;

Figure 2:
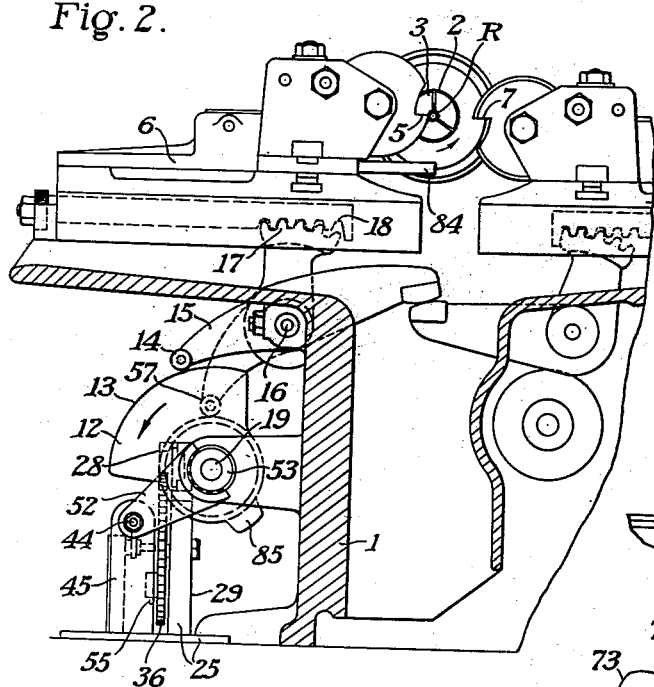
Fig. 2 is a section through a standard type of screw machine, many parts being omitted for the sake of clearness to illustrate a modification of the machine embodying a preferred form of my invention.
Figure 8:
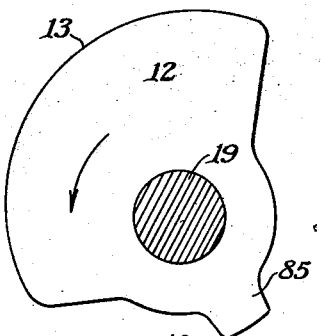
Fig. 8 is a front elevation of the cam used to operate the forming and cut-off tools and also shows a portion of this cam used to cooperate with the threading tool to move the threading wheels together.
Figure 9:
Fig. 9 is a side elevation of a typical screw stick except that in practice many more screws are ordinarily formed on one screw stick.

Referring to Fig. 2, the screw machine frame 1 may support the usual spindle 2 and hollow chuck operation. The stock R may be hexagonal in the collet 3 step and step by any known means and into a position for a forming and a threading operation. After the required number of screws are formed, the stick is submitted to a cut-off operation. The stock R may be hexagonal in form, if six-sided heads are desired as shown in Fig. 9, but any required configuration may be used. The stock R may be formed in blanks for threading and with a narrow neck N between the head H of one screw and the end E of the threaded portion T.

A forming tool 5 may be carried by the slide 6 and a cut-off tool 7 may be carried by the slide 8 as shown in Fig. 2. A threading tool designated broadly as 9 may be fixedly carried on the turret 10 (Fig. 10) which may move on its usual slide 11 to and from its threading position.

Figure 10:
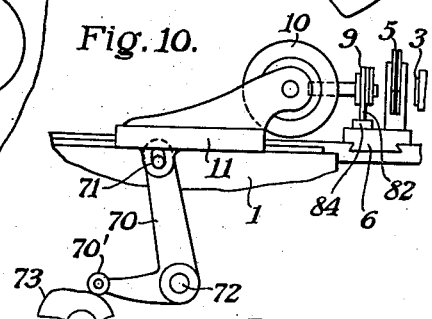
Fig. 10 is a fragmentary side elevation showing schematically the operation of the locked turret threading member.
Figure 3:
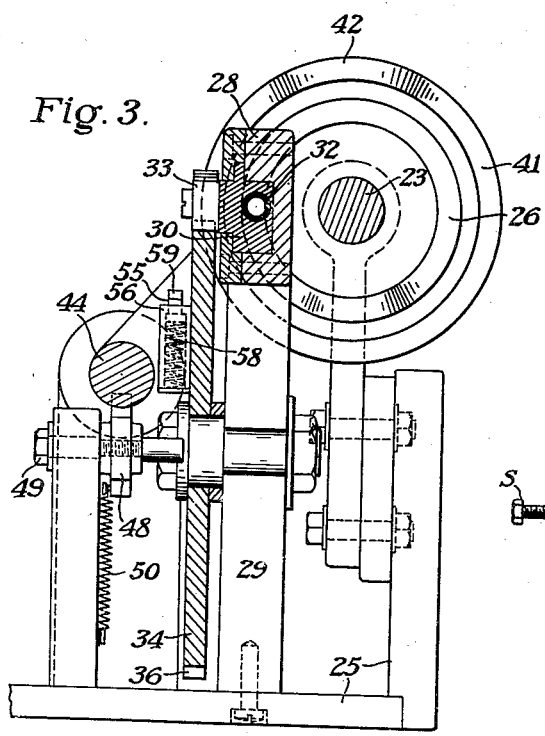
Fig. 3 is a transverse section taken on line 3—3 of Fig. 1.
Figure 4:
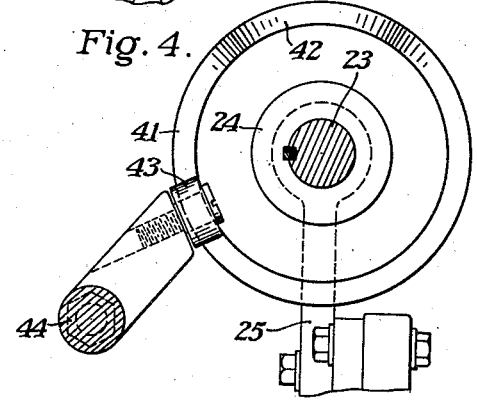
Fig. 4 is a fragmentary section taken on line 4—4 of Fig. 1.

As indicated in Fig. 10, the slide 11 may be operated by a bell crank lever 70, having a pin and slot connection at 71 to the slide. Bell crank lever 70 is pivoted at 72 to the frame 1 and a roller 70' contacts with cam 73, moving in timed relation to cam 26. As usual the turret is mounted on the frame in the center of the machine and parallel to the axis of the work R.

Fig. 7 shows the threading tool 9 to be of a standard type. Here two threading rollers 74 and 75 are each carried on bell crank levers 76 and 77 pivotally mounted on studs 78 and 79. Each bell crank lever has mating teeth 80 and 81 so as to move together and one bell crank has an arm 82 with an adjustable screw 83 for operating both bell cranks when this screw is struck by the operating bar 84 (Fig. 2) which is moved into position for this purpose by the small projection 85 on cam 12. Thus the threading tools roll threads on the desired area of the formed screw blank and in timed relation to the forming tool. The threading by this arrangement is not new per se.

The forming tool 5 and its slide 6 are moved by cam 12 through cam surface 13, the cam follower roller 14 carried by bell crank lever 15 pivoted at 16 to the frame 1 having a gear segment 17 meshing with rack 18 of slide 6. Thus at each revolution of front cam shaft 19 a blank screw is formed on rod stock R and upon each movement of the fixed turret 10 the threading tool, including the pair of threading rollers 74, 75, threads the blank.

In the standard sequence of operations with a screw machine single screws are turned out in three operations; first, form; second, thread; and third, cut off. The usual screws have slotted heads and this is an additional operation. Screw sticks differ in that while they must be first formed and then threaded, the cut off need occur only each time the required number are formed, and of course they do not have slotted heads. If the number desired be 48 (or some other number), then the cut-off tool should only then function. But with standard screw machines each cycle for each screw must include the unused cut-off cycle to obtain the desired cut off when the screw stick is completed. This takes up unnecessary time and materially increases the cost.

I have eliminated the cut off for each screw cycle, utilizing a single cam to do two separate and distinct functions: that is, forming until the desired number of screws are made, then cutting off; so that the machine can be timed for two instead of three (or even four) cycles to greatly increase its capacity. This is done in the following manner.

Figure 1:
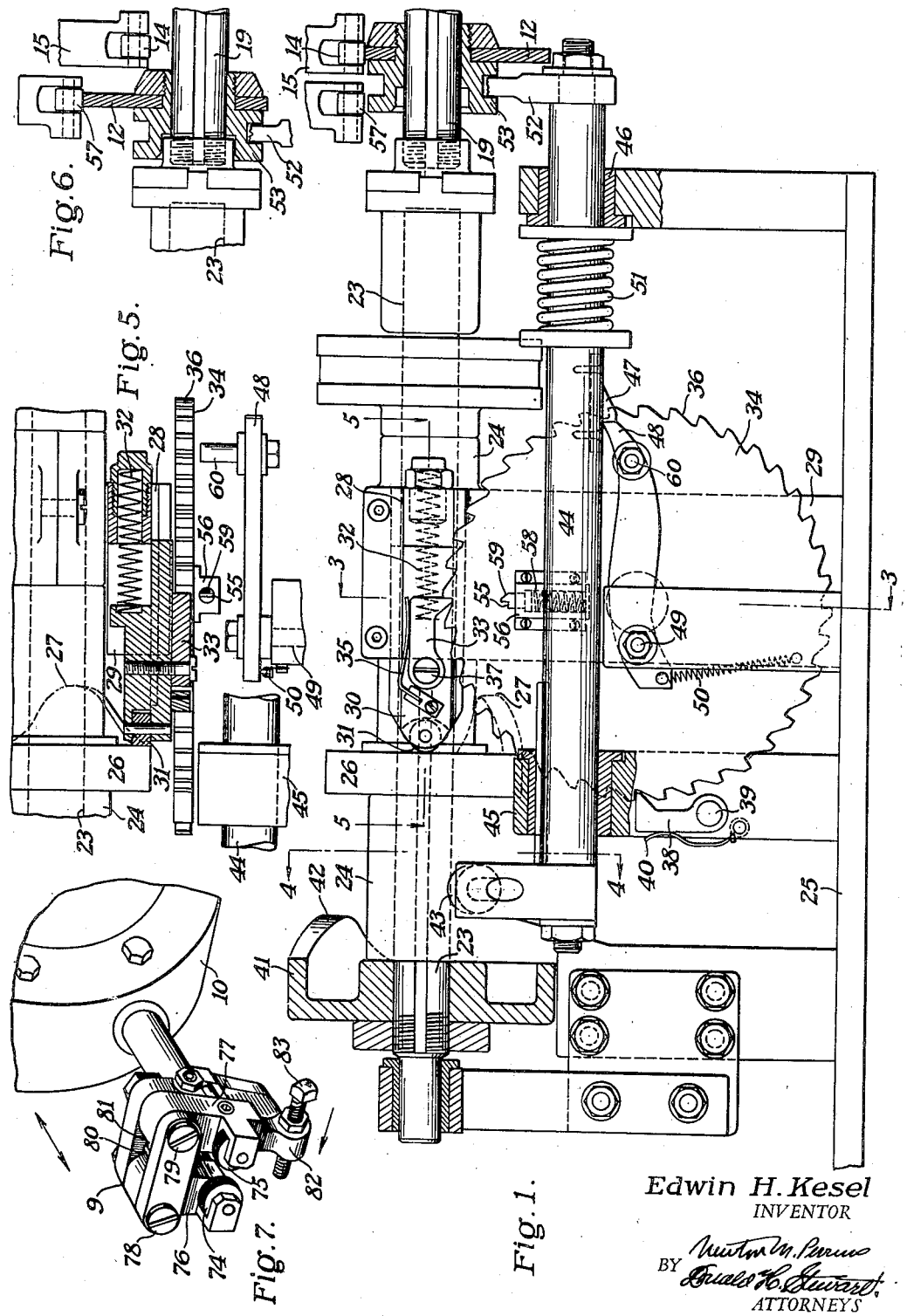
Fig. 1 is a fragmentary side elevation partially in section showing a portion of a mechanism which may be attached to a standard form of screw machine and constructed in accordance with and embodying a preferred form of my invention.

As indicated in Fig. 1, the front cam shaft 19 is extended by attaching a coaxially positioned shaft 23 which may be supported on bearings 24 carried by a supplementary frame 25. This frame may be attached to the main frame 1. An indexing cam 26 is mounted on shaft 23 and has a high point 27. A slideway 28 mounted on supporting arm 29 supports a slide 30, a roller 31 of which is pressed against cam 26. Spring 32 holds the slide roller 31 against cam 26 and at each revolution the high point 27 moves the slide 30 so that pawl 33 moves a ratchet wheel 34 one step. Pawl 33 is pressed by a spring 35 against ratchet teeth 36 and pawl 33 is pivoted upon a stud 37.

Ratchet wheel 34 preferably has one tooth for each screw to be formed on a screw stick S shown in Fig. 9 except that fewer screws than normal are illustrated in this figure. A holding pawl 38 is pivoted on stud 39 and pressed by spring 40 against ratchet teeth 36 to prevent rearward movement of the ratchet wheel 34.

There is a second cam 41, which may be called a reset cam, carried by extension shaft 23, this cam in part determining the position of the forming cam 13 so that once in a predetermined number of revolutions the latter may also serve as a cut-off cam. Cam 41 has a high point 42 with which a roller 43 may contact to slide shaft 44. Shaft 44 constitutes a cam-shifting shaft. This shaft is slidable in bearings 45 and 46 to and from its latched position of Fig. 1 in which it is held by a latch element 47 on the shaft by a latch 48 pivoted on stud 49 and spring held toward shaft 44 by a spring 50. When so held, a spring 51 is under compression and cam 13 is positioned opposite cam follower roller 14 to perform repeated forming operations.

Shaft 44 carries an arm 52 engaging the slidable sleeve 53 carrying cam 13. Slidable sleeve 53 is keyed to turn with but slide upon the front cam shaft 19.

When indexing ratchet 34 operates a sufficient number of steps to produce the required length screw stick, a plunger 55 carried by housing 56 on the ratchet 34 strikes a pin 60 and trips latch 48 from latch 47 releasing shaft 44 and spring 51 moves it and cam 12 having a cam surface 13 to the left with reference to Fig. 1. Then cam follower 57 contacts cam surface 13 as shown in Fig. 6, cutting off the screw stick S, after which cam 41 through roller 43 immediately returns shaft 44 to the right, as in Fig. 1, until latches 47 and 48 engage to hold cam 13 again in position to operate the forming tool 5. All this occurs during a single cycle or at one revolution of shaft 23.

The plunger 55 is carried by housing 56 and is pressed outwardly by a spring 58. There is a beveled contact portion 59 which contacts with latch pin 60 but this beveled surface moves inwardly to release latch 48 as pressure on its spring 50 increases and so that latch 48 may quickly return to its operative position.

It will be apparent that screw sticks can be made with only two cycles for each screw up to the cut-off cycle, which is substituted for the forming cycle, thereby making possible high speed and economical operation of a standard type of screw machine. With such a modified screw machine, screw sticks may be made considerably cheaper than ordinary screws.

I claim:

1. In a machine for making screw sticks of the type including a chuck for holding work, an intermittent work-advancing mechanism, a movably mounted forming tool, a movably mounted threading tool, a power-driven shaft, means for moving each tool to-and-from an operative position with respect to the chuck including the power-driven shaft, a cam driven by the shaft having a first operative position, a first cam follower, and connections between the forming and threading tools and the first cam follower, the combination with said cam for moving the tools, of a shifting device for moving the cam axially from the first operative position to a second operative position, a cut-off tool, connections between said cut-off tool and a cut-off cam follower, the cut-off cam follower lying in the path of the shiftable cam in its second operative position to be operated thereby, and mechanism operable by the cam shaft for shifting the cam after a predetermined number of revolutions of the shaft, an indexing ratchet, a pawl operable by the cam shaft for advancing the ratchet, a cam-shifting shaft, a spring tending to move the shifting shaft in one direction, a latch for holding the shifting shaft against the spring, and a latch trip carried by the ratchet for determining the movement of the cam-shift shaft.

2. In a machine for making screw sticks of the type including a chuck for holding work, an intermittent work-advancing mechanism, a movably mounted forming tool, a movably mounted threading tool, a power-driven shaft, means for moving each tool to-and-from an operative position with respect to the chuck including the power-driven shaft, a cam driven by the shaft having a first operative position, a first cam follower, and connections between the forming and threading tools and the first cam follower, the combination with said cam for moving the tools, of a shifting device for moving the cam axially from the first operative position to a second operative position, a cut-off tool, connections between said cut-off tool and a cut-off cam follower, the cut-off cam follower lying in the path of the shiftable cam in its second operative position to be operated thereby, and mechanism operable by the cam shaft for shifting the cam after a predetermined number of revolutions of the shaft, an indexing ratchet, a pawl operable by the cam shaft for advancing the ratchet, a cam-shifting shaft, a spring tending to move the shifting shaft in one direction, a latch for holding the shifting shaft against the spring, and a latch trip carried by the ratchet for determining the movement of the cam-shift shaft, and a reset cam carried by the cam shaft for shifting the cam-shifting shaft to move the cam to its first operative position after said cam has functioned at its second operative position.

3. In a machine for making screw sticks of the type including a chuck for holding work, an intermittent work-advancing mechanism, a movably mounted forming tool, a movably mounted threading tool, a power-driven shaft, means for moving each tool to-and-from an operative position with respect to the chuck including the power-driven shaft, a cam driven by the shaft, having a first operative position, a first cam follower, and connections between the forming and threading tools and the first cam follower, the combination with said cam for moving the tools, of a shifting device for moving the cam axially from the first operative position to a second operative position, a cut-off tool, connections between said cut-off tool and a cut-off cam follower, the cut-off cam follower lying in the path of the shiftable cam in its second operative position to be operated thereby, and mechanism operable by the cam shaft for shifting the cam after a predetermined number of revolutions of the shaft, an indexing ratchet, a pawl, a slidable mount carrying the pawl, a cam on the cam shaft moving the pawl on its slidable mount and through the pawl turning the index ratchet at each revolution of the cam shaft, a cam-shifting shaft spring-impelled towards a position to shift the cam in its second operative position, latch elements for holding the cam-shifting shaft against spring pressure, a latch release carried by the ratchet to function after predetermined movements of the ratchet to release the cam-shifting shaft whereby it may be moved by its spring.

4. In a machine for making screw sticks of the type including a chuck for holding work, an intermittent work-advancing mechanism, a movably mounted forming tool, a movably mounted threading tool, a power-driven shaft, means for moving each tool to-and-from an operative position with respect to the chuck including the power-driven shaft, a cam driven by the shaft having a first position, a first cam follower, and connections between the forming and threading tools and the first cam follower, the combination with said cam for moving the tools, of a shifting device for moving the cam axially from the first operative position to a second operative position, a cut-off tool, connections between said cut-off tool and a cut-off cam follower, the cut-off cam follower lying in the path of the shiftable cam in its second operative position to be operated thereby, and mechanism operable by the cam shaft for shifting the cam after a predetermined number of revolutions of the shaft, an indexing ratchet, a pawl, a slidable mount carrying the pawl, a cam on the cam shaft moving the pawl on its slidable mount and through the pawl, turning the index ratchet at each revolution of the cam shaft, a cam-shifting shaft spring-impelled towards a position to shift the cam in its second operative position, latch elements for holding the cam-shifting shaft against spring pressure, a latch release carried by the ratchet to function after predetermined movements of the ratchet to release the cam-shifting shaft whereby it may be moved by its spring, a cam follower carried by the cam-shifting shaft and a cam carried by the cam shaft for engaging said cam follower and moving the cam-shifting shaft to tension the spring and latch the cam-shifting shaft in position to move said shiftable cam to an operative position.

5. In a machine for making screw sticks of the type including a chuck for holding work, an intermittent work-advancing mechanism, a movably mounted forming tool, a movably mounted threading tool, a power-driven shaft, means for moving each tool to-and-from an operative position with respect to the chuck including the power-driven shaft, a cam driven by the shaft having a first operative position, a first cam follower, and connections between the forming and threading tools and the first cam follower, the combination with said cam for moving the tools, of a shifting device for moving the cam axially from the first operative position to a second operative position, a cut-off tool, connections between said cut-off tool and a cut-off cam follower, the cut-off cam follower lying in the path of the shiftable cam in its second operative position to be operated thereby, and mechanism operable by the cam shaft for shifting the cam after a predetermined number of revolutions of the shaft, an indexing ratchet, a pawl, a slidable mount carrying the pawl, a cam on the cam shatf moving the pawl on its slidable mount and through the pawl, turning the index ratchet at each revolution of the cam shaft, a cam-shifting shaft spring-impelled towards a position to shift the cam in its second operative position, latch elements for holding the cam-shifting shaft against spring pressure, a latch release carried by the ratchet to function after predetermined movements of the ratchet to release the cam-shifting shaft whereby it may be moved by its spring, a cam follower carried by the cam-shifting shaft and a cam carried by the cam shaft for engaging said cam follower and moving the cam-shifting shaft to tension the spring and latch the cam-shifting shaft in position to move said shiftable cam to an operative position, said last-mentioned cam turning with the cam shaft, but being engageable with the cam-shifting shaft cam follower only when the cam-shifting shaft has moved the shiftable cam to its first-mentioned operative position.

6. In a machine for making screw sticks of the type including a chuck for holding work, an intermittent work-advancing mechanism, a movably mounted forming tool, a movably mounted threading tool, a power-driven shaft, means for moving each tool to-and-from an operative position with respect to the chuck including the power-driven shaft, a cam driven by the shaft having a first operative position, a first cam follower, and connections between the forming and threading tools and the first cam follower, the combination with said cam for moving the tools, of a shifting device for moving the cam axially from one operative position to a second operative position, a cut-off tool, connections between said cut-off tool and a cut-off cam follower, the cut-off cam follower lying in the path of the shiftable cam in its second operative position to be operated thereby, and mechanism operable by the cam shaft for shifting the cam after a predetermined number of revolutions of the shaft, said cam-shifting device including a cam-shifting shaft parallel with the cam shaft mounted to slide axially, and spring means tending to move the cam-shifting shaft to hold the cam in one operative position, said mechanism being adapted to control the movement of the cam-shifting shaft to a second operative position, a latch for holding the cam-shifting shaft against the pressure of said spring means with the cam in its first operative position, and a latch-tripping member, means for moving the latch-tripping member from the cam shaft at each revolution thereof and a plurality of times until said tripping member may release the latch enabling the spring means to slide the cam-shifting shaft axially to thereby move the cam to its second operative position.

7. In a machine for making screw sticks of the type including a chuck for holding work, an intermittent work-advancing mechanism, a movably mounted forming tool, a movably mounted threading tool, a power-driven shaft, means for moving each tool to-and-from an operative position with respect to the chuck including the power-driven shaft, a cam driven by the shaft having a first operative position, a first cam follower, and connection between the forming and threading tools and the first cam follower, the combination with said cam for moving the tools, of a shifting device for moving the cam axially from one operative position to a second operative position, a cut-off tool, connections between said cut-off tool and a cut-off cam follower, the cut-off cam follower lying in the path of the shiftable cam in its second operative position to be operated thereby, and mechanism operable by the cam shaft for shifting the cam after a predetermined number of revolutions of the shaft, said cam-shifting device including a cam-shifting shaft parallel with the cam shaft mounted to slide axially, and spring means tending to move the cam-shifting shaft to hold the cam in one operative position, said mechanism being adapted to control the movement of the cam-shifting shaft to a second operative position, a latch for holding the cam-shifting shaft against the pressure of said spring means with the cam in its first operative position, and a latch-tripping member, means for moving the latch-tripping member from the cam shaft at each revolution thereof and a plurality of times until said tripping member may release the latch enabling the spring means to slide the cam-shifting shaft axially to thereby move the cam to its second operative position, a reset cam carried by the cam shaft, a cam follower carried by the cam-shifting shaft for moving said shaft to restore the cam to its first operative position.

8. In a machine for making screw sticks of the type including a chuck for holding work, an intermittent work-advancing mechanism, a movably mounted forming tool, a movably mounted threading tool, a power-driven shaft, means for moving each tool to-and-from an operative position with respect to the chuck including the power-driven shaft, a cam driven by the shaft having a first operative position, a first cam follower, and connections between the forming and threading tools and the first cam follower, the combination with said cam for moving the tools, of a shifting device for moving the cam axially from the first operative position to a second-operative position, a cut-off tool, connections between said cut-off tool and a cut-off cam follower, the cut-off cam follower lying in the path of the shiftable cam in its second-operative position to be operated thereby, and mechanism comprising a cam-shifting shaft mounted for axial movement, connections between the shaft and the cam for moving the latter by the former, a slide mounted on the machine, a pivoted pawl carried by the slide, a slide oscillating cam carried by the cam shaft, a ratchet lying in the path of the pawl for intermittent movement therefrom, a reset cam on the cam shaft, spring means tending to move the cam-shifting shaft in position to hold the cam to a second operative position, a latch for holding the cam-shifting shaft to position the cam in a first operative position, a latch for holding the cam-shifting shaft in the last-mentioned position, and means carried by the ratchet for releasing the latch after a predetermined number of actuations of the pawl.

9. The machine for making screw sticks defined in claim 8 characterized by a reset cam carried by the cam shaft, a reset cam follower lying in the path of said reset cam when the latch is tripped and the cam-shifting shaft lies with the cam in the second operative position, said reset cam and follower restoring the shaft to a latched position through a revolution of the cam shaft.

10. The machine for making screw sticks defined in claim 8 characterized by the means carried by the ratchet for tripping the latch consisting of a beveled spring-pressed plunger shaped to engage and release the latch when contacted therewith.

11. The machine for making screw sticks defined in claim 8 characterized by the means carried by the ratchet for tripping the latch consisting of a beveled spring-pressed plunger shaped to engage and release the latch when contacted therewith, a reset cam carried by the cam shaft, a reset cam follower carried by the cam-shifting shaft to relatch the cam-shifting shaft when the latch is released and, as the cam shaft turns, said cam and reset cam being positioned in the cam shaft to operate successively.

EDWIN H. KESEL.

REFERENCES CITED

The following references are of record in the file of this patent:

UNITED STATES PATENTS

| Number | Name | Date |
| --- | --- | --- |
| 2,286,698 | Ure | June 16, 1942 |
| 2,475,311 | Daly | July 5, 1949 |